United States Patent [19]
Good et al.

[11] Patent Number: 5,533,544
[45] Date of Patent: Jul. 9, 1996

[54] SUPPLY BIASED PNEUMATIC PRESSURE RELAY

[75] Inventors: Stanley R. Good; Barry L. Gaarder, both of Marshalltown, Iowa

[73] Assignee: Fisher Controls International, Inc., Clayton, Mo.

[21] Appl. No.: 456,243

[22] Filed: May 31, 1995

Related U.S. Application Data

[60] Division of Ser. No. 114,955, Aug. 31, 1993, Pat. No. 5,439,021, which is a continuation-in-part of Ser. No. 942,758, Sep. 9, 1992, abandoned.

[51] Int. Cl.$^6$ .................................................. G05D 16/06
[52] U.S. Cl. ............................................................ 137/85
[58] Field of Search ................................................ 137/85

[56] References Cited

U.S. PATENT DOCUMENTS

| | | |
|---|---|---|
| 1,180,897 | 4/1916 | Williams . |
| 2,666,278 | 1/1954 | Matasovic ........................ 137/557 X |
| 3,123,094 | 3/1964 | Toschkoff ........................ 137/505.13 |
| 3,245,619 | 4/1966 | Kreuter ............................ 137/85 X |
| 3,334,642 | 8/1967 | Borthwick ....................... 137/85 |
| 3,349,787 | 10/1967 | Thieme .......................... 137/85 |
| 3,842,679 | 10/1974 | Iwao et al. ..................... 73/423 A |
| 4,172,388 | 10/1979 | Gabrielson ..................... 73/721 |
| 4,176,557 | 12/1979 | Johnston ........................ 73/708 |
| 4,213,478 | 7/1980 | Olsen et al. ................... 137/85 |
| 4,239,182 | 12/1980 | Arnold et al. .................. 251/61.2 |
| 4,315,432 | 2/1982 | Newton .......................... 73/431 |
| 4,329,910 | 5/1982 | Olsen et al. ................... 91/375 R |
| 4,399,836 | 8/1983 | de Versterre et al. ......... 137/487.5 |
| 4,453,559 | 6/1984 | Varnum .......................... 137/85 |
| 4,627,286 | 12/1986 | Pehlgrim ......................... 73/431 |
| 4,653,330 | 3/1987 | Hedtke .......................... 73/756 |
| 4,653,523 | 3/1987 | Brown ............................. 137/85 |
| 4,760,859 | 8/1988 | Brown ............................. 137/84 |
| 4,819,543 | 4/1989 | Leinen ........................... 91/363 R |
| 4,855,659 | 8/1989 | Riensche ....................... 137/85 X |
| 4,898,200 | 2/1990 | Odajima et al. ................ 137/487.5 X |
| 4,928,530 | 5/1990 | Lehto et al. ................... 73/756 |
| 4,970,898 | 11/1990 | Walish et al. .................. 73/706 |
| 5,070,732 | 12/1991 | Duncan et al. ................ 73/431 |
| 5,159,949 | 11/1992 | Prescott et al. ............... 137/85 |
| 5,172,713 | 12/1992 | Hall ............................... 251/367 X |

FOREIGN PATENT DOCUMENTS

| | | |
|---|---|---|
| 0464966A1 | 3/1991 | European Pat. Off. . |
| 0442033A1 | 8/1991 | European Pat. Off. . |
| 2647522A1 | 11/1990 | France . |
| WO92/22860 | 12/1992 | WIPO . |

OTHER PUBLICATIONS

User's Manual for the Model 3311 "Current-to-Pressure (I/P) Transducer", Publication No. 4595, Rosemount Measurement Control Analytical Valves, Sep. 1990, pp. 3–2, 6–5.

Primary Examiner—Gerald A. Michalsky
Attorney, Agent, or Firm—Marshall, O'Toole, Gerstein, Murray & Borun

[57] ABSTRACT

An electro-pneumatic converter device with modular components and with supporting housing structure enabling the device to be readily convertible from a current to pressure positioner to a current to pressure transducer. A valve positioner with an enclosure having a housing, a modular base, and a separable field terminal box. A self contained cover mounted to the enclosure with no additional mounting components. A plastic pneumatic relay ultrasonically welded together to eliminate metal mounting parts and lower assembly time. Open channels in a housing surface cooperating with a gasket to provide fluid passageways between the housing and the modular base. Pressure gauges are removably mounted on a modular unit for location completely within the housing. A floating interconnect terminal board permits self-aligning of mating terminals as the modular unit is inserted into the housing. A supply biased pneumatic pressure relay has supply pressure channeled to the supply port and also to a supply bias cavity through a capillary hole.

4 Claims, 14 Drawing Sheets

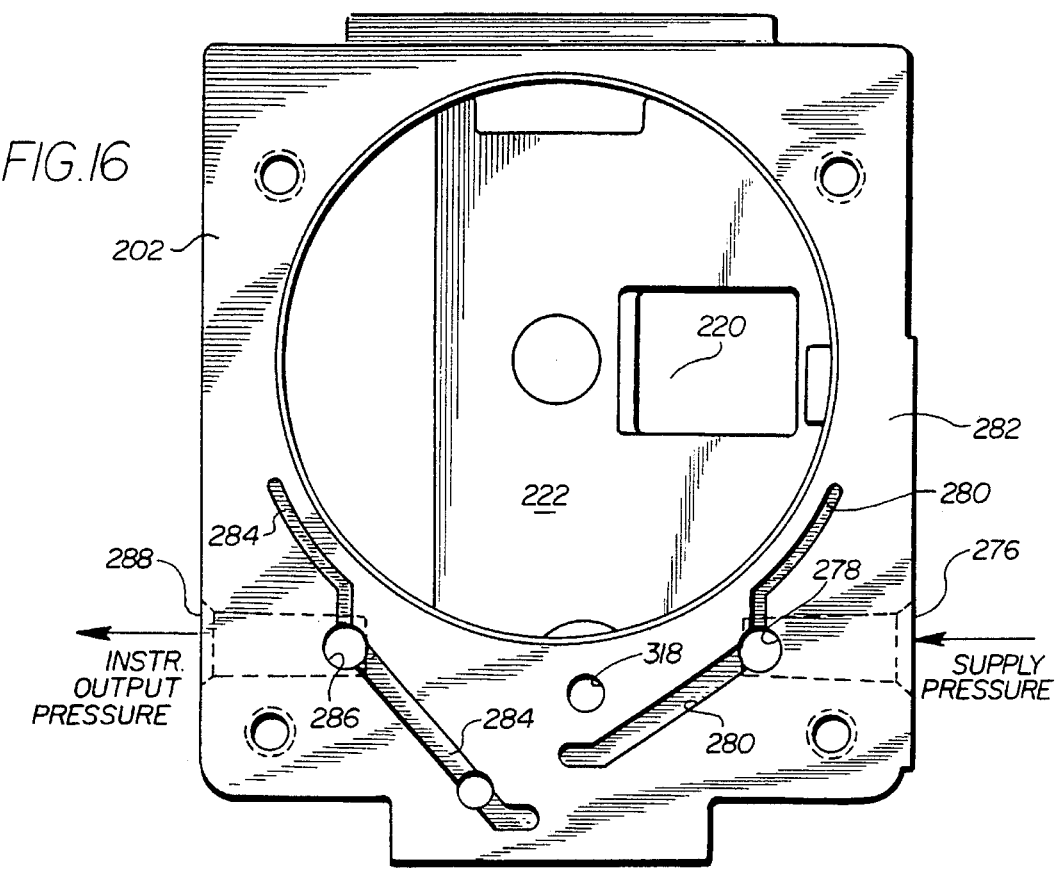
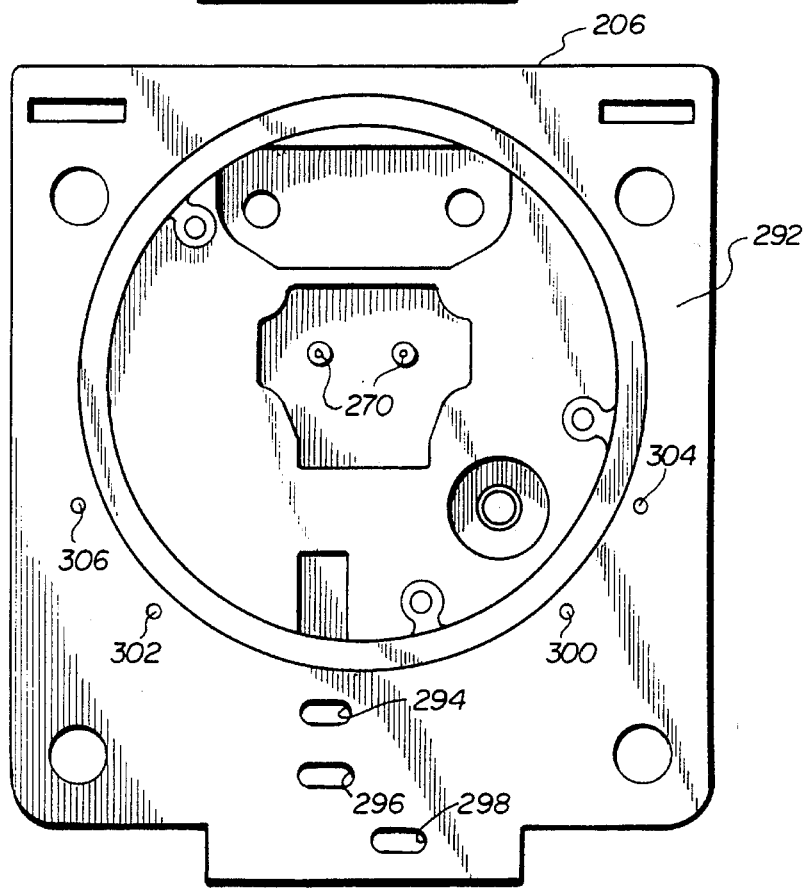

SUPPLY BIASED PNEUMATIC PRESSURE RELAY

This is a divisional of application Ser. No. 08/114,955, filed Aug. 31, 1993, now U.S. Pat. No. 5,439,021, which is a continuation-in-part of application Ser. No. 07/942,758, filed Sep. 9, 1992, abandoned.

This invention relates to pressure relay devices and in particular to supply biased pneumatic pressure relays useful in current to pressure transducers and valve positioner devices.

BACKGROUND OF THE INVENTION

Electro-pneumatic converters, such as current to pressure transducers are in common use as field instruments mounted in pipeline systems for controlling the process fluid. Subsequently these devices are installed in potentially hazardous explosive environments. Such devices receive, for example, a variable current input signal of between 4–20 mA and eventually provide a variable pressure output to an actuator for a fluid control valve. Since these devices can be employed in a potentially explosive environment, to provide an explosion proof device the electrical and pneumatic components are isolated within an explosion proof portion of the transducer/positioner unit, except for the pressure gauges which are normally located on the unit exterior.

With presently available electro-pneumatic converters operating in a potentially explosively hazardous area, in the event either service of the unit or normal maintenance is required, the electric power must be disconnected and/or the entire unit must be removed from the potentially hazardous area in order to be worked on. Occasionally, for instance, the pneumatic elements must be adjusted or removed and replaced. In present units, if the seal of the explosion proof portion of the unit is removed in order to get access to these pneumatic elements, then a potentially unsafe condition is created where any spark caused in the electrical elements could ignite potentially explosive gases. Accordingly, shutting down the electrical power in order to service or remove the unit from the hazardous area is time consuming, costly, and wasteful.

In addition, with the electrical and pneumatic components maintained within an explosion proof portion of the transducer/positioner unit, the mounting of the pressure gauges on the portion outside the explosion proof portion of the unit is required. However, this exposes the pressure gauges to the atmosphere as well as to physical damage from unintentional blows to the pressure gauges protruding even slightly from the transducer/positioner exterior surface.

Accordingly, it is desired to provide an electro-pneumatic converter which can be used in a potentially explosive environment and wherein pneumatic components can be serviced without requiring electrical shutdown or removal of the entire unit from the hazardous area.

In addition, it is desired to provide an electro-pneumatic converter where the pressure gauges can be protected from the atmosphere as well as from any unintentional physical damage.

Currently available pressure transducer instruments contain a pressure to current sensor to convert a pressure signal to a current signal in supplying feedback to the instrument. Analog pressure transducer units are available, as well as respective digital pressure transducer units. Also currently available are separate valve positioner units which incorporate feedback from the valve supplied from a mechanical linkage with the valve stem. Both analog valve positioner units and digital valve controller units are separately available.

Typically, the customer chooses the type of instrument needed in order to fit within his present system. Thus, a customer may initially choose to purchase a pressure transducer instrument in analog form as most conveniently adaptable to his present system. If the customer's system changes or he wishes to modify his system to operate in digital form, the customer must then purchase the required separate instruments. Also, if the customer wants to change to a valve positioner configuration when he initially purchased a pressure transducer instrument, he must purchase a new valve positioner device in the proper data format to fit his changed system.

It is therefore further desired to provide an electro-pneumatic instrument which is usable and readily convertible from a pressure transducer to a valve positioner or vice versa. In addition, it is desired to enable a user to readily convert from an analog data handling capability to a digital data handling capability or vice versa. Furthermore, it is desired to enable the instrument user to incorporate and to change to any desired communications data protocol.

In existing electro-pneumatic instruments, the instrument housing is usually formed of a casting. The casting must then be drilled with precise holes to form passageways and interconnected passageways to enable the desired communication of fluid between components. Forming of the desired passageways by drilling intersecting holes in the casting requires time consuming precision drilling and set up of the housings for drilling. Present instruments also utilize many individual sub-assembly components requiring stocking and assembly time. The instrument covers, for instance, normally require two or more pins and locks or other multi-part fasteners to mount the cover to the instrument. This requires an inventory of the several parts and an inordinate amount of assembly time to assemble the cover to the instrument.

Pneumatic relays, used extensively in positioners and transducers, normally have been made from aluminum based materials. Machine screws are used to assemble the aluminum relay body components together while clamping rubber diaphragms and O-rings to provide the pressure seals. Assembly of these numerous sub-assembly components of present pneumatic relays is tedious and costly in the manufacturing environment.

It is desired therefore to eliminate components or at least reduce the number of components required for an electro-pneumatic instrument.

SUMMARY OF THE INVENTION

In accordance with the present invention there is provided a versatile modular configuration for an electro-pneumatic instrument that can serve as a platform of construction for a wide range of output devices which includes, for example: a digital pressure transducer; a digital valve controller; an analog valve positioner; and an analog pressure transducer. All of the aforementioned output devices available from the present invention can provide the following features:

1. A modular configuration with a field termination compartment, an electronics compartment, and a pneumatic compartment which are all environmentally segregated from each other;

2. A modular configuration which is explosion proof, and allows maintenance and serviceability of the pneumatic elements without interfering with the electrical components; and 3. A modular configuration permitting user selected variations in feedback and mountings to accommodate both sliding stem valve actuators and rotary shaft valve actuators.

In accordance with the principles of the present invention, there is provided an electro-pneumatic instrument of modular construction which is readily convertible from a pressure transducer to a valve positioner and vice versa. In the preferred embodiment of the invention, the convertible instrument includes an enclosure having a housing defining a hollow interior, and a modular base containing electrical and pneumatic components, where the modular base is removably insertable into the housing. A housing portion is included on the housing and is adapted for receiving and mounting therein a potentiometer and shaft in converting the instrument to a valve positioner. The housing portion communicates with the hollow interior to enable the potentiometer output to be connected to the electrical components on the modular base via the housing portion and the housing hollow interior.

The housing portion may be formed of an elongated cylindrical boss extending along the housing and which includes a pocket interior to receive the potentiometer at one end. The pocket interior intersects with the housing hollow interior and a bushing is threadably mounted on the elongated cylindrical boss to supportably mount the potentiometer shaft.

In converting a valve positioner utilizing the present electro-pneumatic instrument of the present invention to a pressure transducer, this can be readily provided by removing the potentiometer from the housing portion, disconnecting the potentiometer output cable from the main printed circuit board mounted on the modular base, and replacing the main circuit board to accommodate the signals appropriate to a pressure transducer as is known in the art.

The preferred embodiment also includes an electrical terminal box mounted on the housing with a passageway between the housing interior and the terminal box. An electrical terminal board is replaceably mounted in the terminal box which includes a removable cover for access thereto. A cable harness is connected to the electrical terminal board in the terminal box and extends through the passageway and the housing hollow interior for connection to the main circuit board on the modular base. The terminal board and cable harness are replaceable to accommodate corresponding desired formats and functions, such as analog, digital, communication or data protocols.

In accordance with another aspect of the present invention, a housing is provided with a substantially flat housing mounting surface with open channels or slots within the surface. A modular base has a modular base mounting surface opposite to the housing mounting surface. A gasket is provided intermediate the housing mounting surface and the modular base mounting surface. The gasket covers the open channels so as to define the housing fluid passageways, and further includes apertures for communicating the housing fluid passageways to the modular base fluid passageways. A distinct advantage of this aspect of the invention is the elimination of the need to drill precise holes through the housing or to precisely locate and drill intersecting holes to form the desired fluid communicating passageways.

In accordance with still another aspect of the present invention, there is provided a cover with self-contained mounting ears shaped for ease of inserting the ears into the module base so the cover is retained on the module base in a closed configuration and yet can be readily removed from the module base if desired in an open configuration.

In accordance with a further aspect of the present invention, there is provided a pneumatic relay with plastic molded structural body components. These components are ultrasonically welded together in a manner that clamps the diaphragm to provide the pressure seals, thus eliminating the need for machine screws. Thus, the number of sub-assembly components are minimized and the assembly costs for the pneumatic relay are drastically reduced by almost one-half.

There is also provided an electro-pneumatic converter in the form of a current to pressure transducer/positioner unit having an enclosure which includes a housing and module base for electrical and pneumatic components with a compartmented portion of the unit forming two segregated compartments for the respective electrical and pneumatic components. A dividing interior wall between opposite sides of the module base defines a segregated compartment between the dividing interior wall and a first portion of the module base opposite the dividing interior wall in a first direction. This segregated compartment preferably contains the electrical components. Another segregated compartment is defined between the dividing interior wall and a second portion of the module base opposite the dividing interior wall in a second direction opposite from the first direction for preferably containing the pneumatic components isolated from the electrical components.

A removable cover is preferably provided for the segregated compartment containing the pneumatic components. Accordingly, removing the cover enables access to the pneumatic component segregated compartment for servicing the pneumatic components while maintaining the electrical components isolated. Therefore, with the present invention, the explosion proof electronic compartment remains isolated and undisturbed and all of the explosion proof elements can remain intact while one services the pneumatic elements in the unit of the present invention. Thus, there is no need to disconnect the electrical power while working on the pneumatic elements in the unit of the present invention.

The significant advantage of this aspect of the invention includes the ability to adjust or remove and replace the pneumatic elements while the power is connected without breaking the seal of the explosion proof portion of the transducer/positioner. Other significant advantages include the ability to provide additional maintenance features, such as stroking the pneumatic elements fully opened or closed to perform maintenance diagnosis of the unit. The pneumatic elements can also be adjusted to change pneumatic zero during maintenance or troubleshooting. Also, access to the supply pressure primary restriction which may become clogged and requires cleanout is readily provided in accordance with this invention.

In accordance with another aspect of the present invention, an electro-pneumatic converter unit includes an enclosure having a housing defining a hollow interior and a modular base removably insertable into the housing hollow interior so as to be surrounded by the enclosure. Electrical and pneumatic converter components are mounted on the modular base including one or more pressure gauges so that the pressure gauges are located within the enclosure and thereby protected from the environment and any physical damage. The gauges, which are mounted in the pneumatic compartment are in an atmosphere which is constantly being purged by the supply pressure medium, thus affording them additional protection to corrosive atmospheres not seen with devices with externally mounted pressure gauges. The pressure gauges are preferably threadably mounted on the modular base for ease in servicing and replacement.

In accordance with still another aspect of the present invention, the modular base includes a dividing interior wall. First means are provided for mounting the electrical components on one side of the dividing interior wall. Second means are provided for mounting the pneumatic components including pressure gauges on the opposite side of the dividing interior wall. Accordingly, as the modular base is insertably mounted into the housing interior, segregated compartments are defined for respectively isolating the electrical components from the pneumatic components.

In accordance with still another aspect of the invention there is provided an improved pneumatic pressure relay for a fluid actuator control valve assembly. The supply pressure is communicated to a supply bias cavity through a capillary hole to maintain a substantially constant supply pressure of the relay. Pressure transients in response to load changes are isolated from the supply bias cavity by the capillary hole.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 16 is an elevational view of the instrument housing portion showing channels in the surface for fluid passageways;

FIG. 17 is an elevational view of the modular base showing the modular base surface facing the housing surface of FIG. 16.

DETAILED DESCRIPTION

The modular and convertible aspect of the invention illustrated in FIGS. 1–9 will be described in connection with an embodiment comprising a current to pressure transducer. It is to be understood that the teachings herein can as well be applied to other electro-pneumatic converter devices to solve problems similar to those which are solved by the present invention. As an example, while this description is in connection with a current to pressure transducer, it is well-known in the art that such devices can readily be converted to a current to pressure positioner following the teachings herein.

The flexible modular and convertible aspect of the invention illustrated in FIGS. 10–18 will be described in connection with a preferred embodiment comprising a current to pressure positioner which is more readily convertible to a current to pressure transducer and vice versa than the embodiment of FIGS. 1–9. Accordingly, the present description is to be understood to be for purposes of describing the preferred embodiment and is not meant to limit the scope of the invention and the claims. Thus, the invention and the claims are to be given a broad interpretation consistent with the teachings herein.

I. Convertible Current To Pressure Transducer

Figure 1:
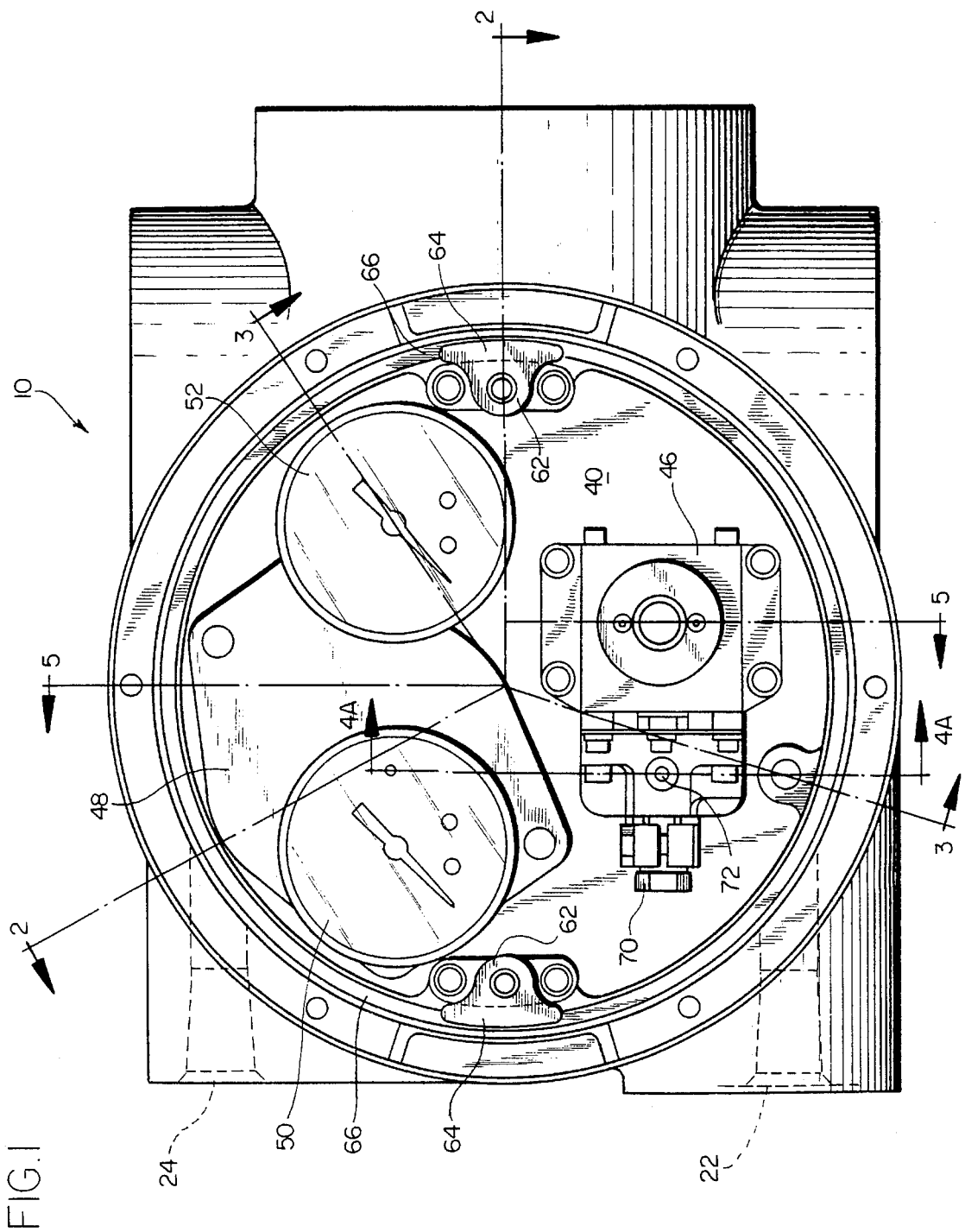
FIG. 1 is a front elevational view illustrating a current to pressure transducer having an enclosure with a housing and a removable module base in accordance with the present invention.
Figure 2:
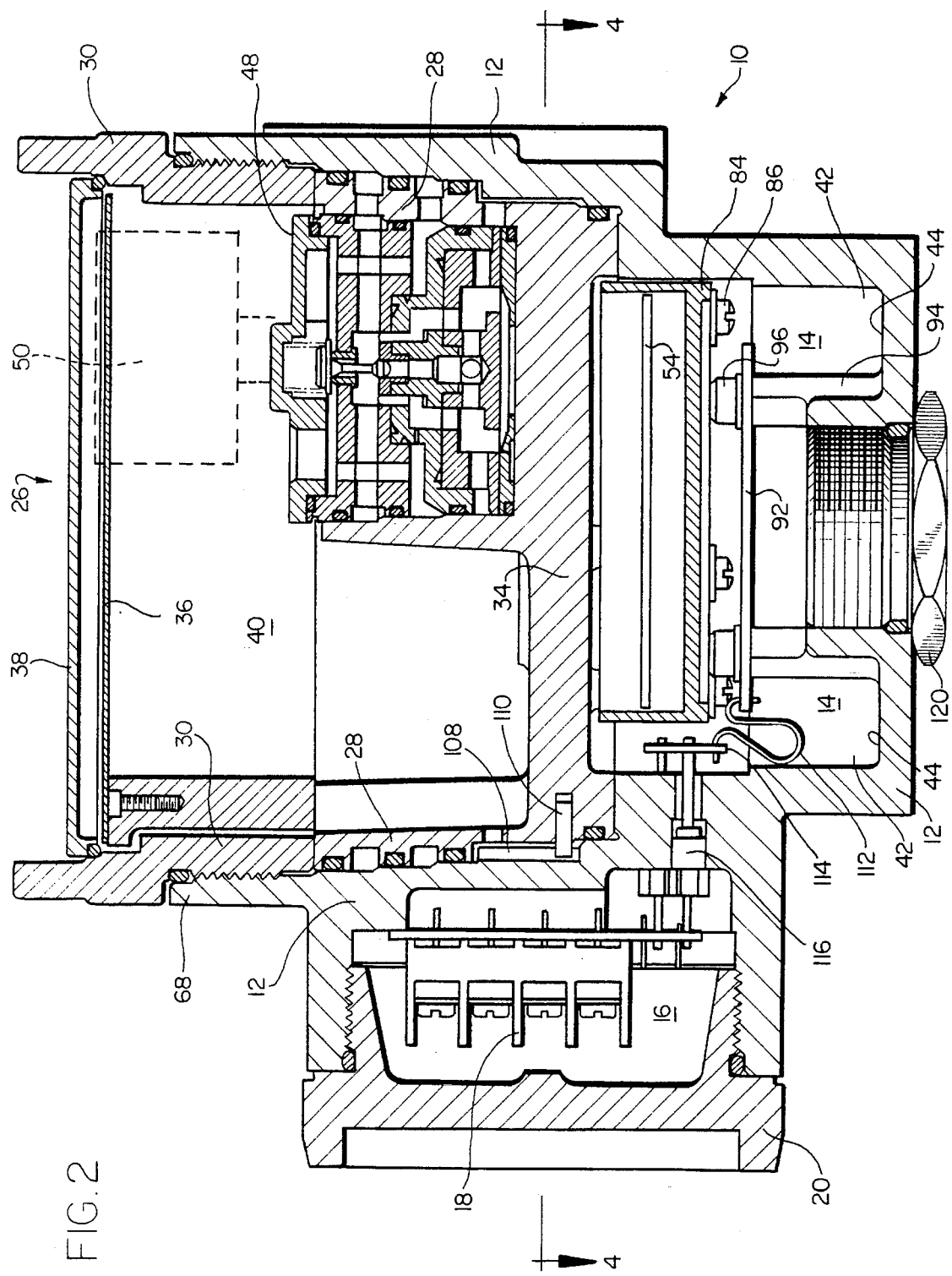
FIG. 2 is a cross-sectional view taken along section lines 2—2 of the current to pressure transducer shown in FIG. 1, with certain components removed for clarity.

Referring now to FIGS. 1 and 2, there is illustrated a current to pressure transducer 10 having an enclosure which includes a housing 12 with one portion defining a hollow interior 14. The housing 12 includes a field terminal box portion 16 including a field terminal strip 18 for suitable connection to an electrical signal cable for receiving a current control signal from a distributing control system, so as to for instance monitor a process. End cap 20 is removable from the housing so that the appropriate cable wiring connections can be made to terminal 18.

Housing 12 also includes an inlet 22 for receiving a supply pressure from a pneumatic supply source, and an outlet port 24 through which the output pressure can be suitably coupled to a positioner or directly to a valve actuator. Typically, in response to a variable 4–20 mA current control signal, current to pressure transducer 10 provides a variable pressure output at outlet 24.

A modular base 26 (see FIG. 3) contains the electrical components and the pneumatic components for current to pressure transducer 10. Typically, this will consist of a current to pressure converter device such as a I/P nozzle block having a flapper for converting the variable current control signal input into a variable nozzle pressure signal; a pressure relay receiving the variable nozzle pressure signal and providing a variable pressure output on outlet 24; a pressure gauge monitoring the supply pressure coupled to inlet port 22; a second pressure gauge monitoring the pressure output on outlet 24; and electronic equipment such as a pressure sensor and a printed circuit board with circuitry to process the electrical signals as required.

Modular base 26 includes a metal base 28 having a threaded ring 30 and O-rings 32 so that modular base 26 can be inserted into housing 12 by threadable engagement. Reference may be made to FIG. 2, wherein modular base 26 is shown in its complete threadable mounting position when fully inserted within housing 12.

The modular base also includes a modular wall 34 which provides the mounting of the pressure components on one side and the electrical components on the other side. In the modular base 26, and opposite wall 34, there is provided a masking plate 36 and a clear cover plate 38 forming a pressure compartment 40 in the modular base and defined between modular wall 34 and cover plate 38. With reference to FIG. 2, it can be seen that when the modular base is insertably mounted into the housing, an electrical compartment 42 is defined as part of housing interior 14 and is specifically defined between modular wall 34 and a housing side 44.

Figure 3:
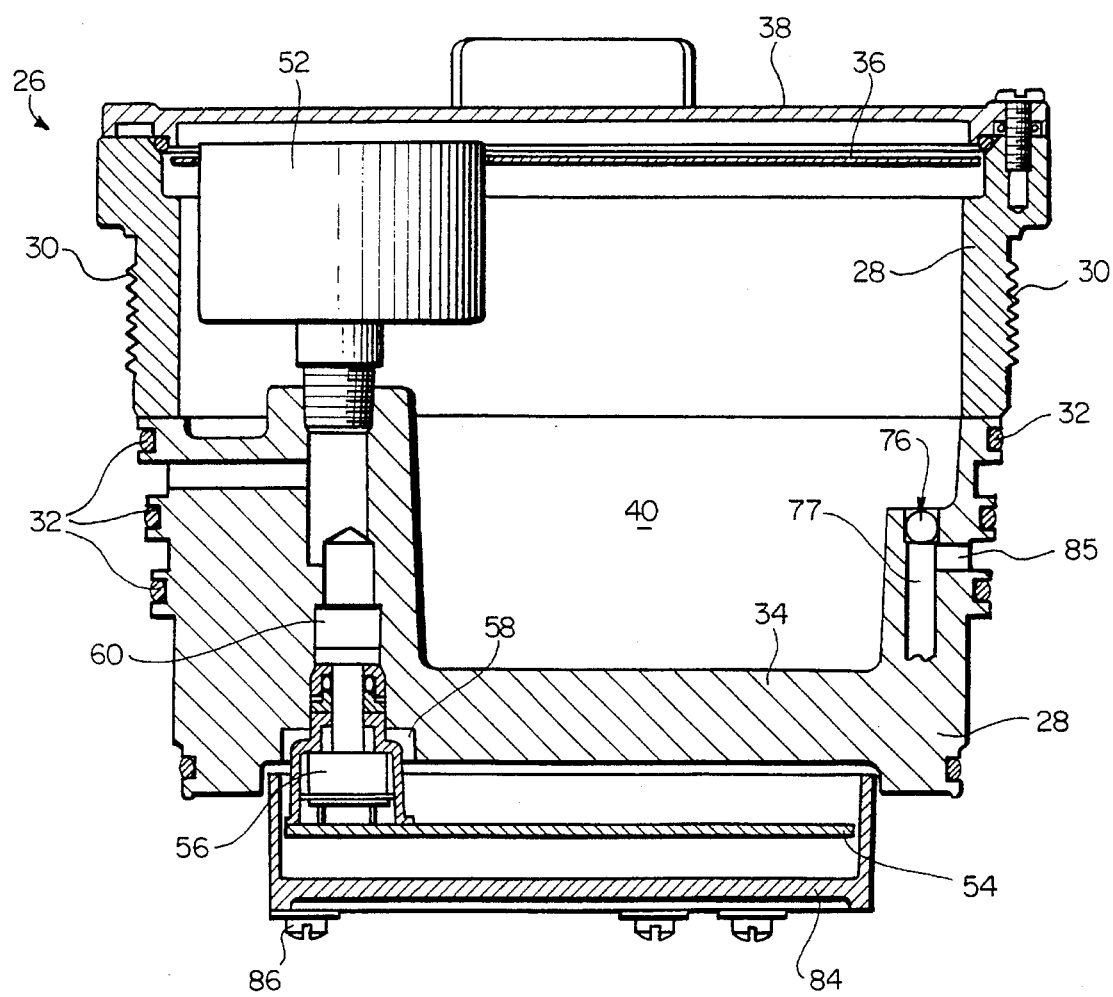
FIG. 3 is a sectional view of the module taken along section lines 3—3 of the current to pressure transducer shown in FIG. 1, with certain components removed for clarity.

With reference to FIGS. 1–3 it can be seen that the pressure components are mounted in the modular base on one side of modular wall 34 and the electrical components are mounted on the other side of wall 34. For example, an I/P nozzle block-flapper unit 46, a pneumatic relay 48, and pressure gauges 50, 52 are all mounted in pneumatic compartment 40 on one side of wall 34. A printed circuit board 54 containing electrical components and a pressure sensor 56 are mounted on the opposite side of modular wall 34 so that they are confined within electrical compartment 42 when the modular base is inserted into the housing.

Accordingly, as can be seen from FIG. 2, the electronic components are isolated within segregated electrical compartment 42 and the pressure components are isolated in segregated pressure compartment 40 on opposite sides of modular wall 34. All of the electrical and pneumatic components, including the pressure gauges, are maintained within the instrument enclosure. It is understood, of course, that suitable explosion preventing devices are inserted in the orifices through wall 34 which may otherwise interconnect compartments 40 and 42. As an example, with reference to FIG. 3, aperture 58 through wall 34 interconnects pressure gauge 52 and pressure sensor 56. A commercially available item known as a flame arrester 60 is inserted in aperture 58. The flame arrester 60 may comprise a porous metal plug which allows pressure to pass through the plug but which will cool and lower the temperature of any flame in aperture 58 to prevent ignition of potentially hazardous environments.

Threaded ring 30 is free to rotate with respect to metal base 28. The threaded ring is securely captured between metal base 28 on one side and two stanchions 62 mounted to metal base 28 and having a projecting ledge 64 slightly spaced from a rim 66 of threaded ring 30.

This enables the threaded ring to rotate and threadably engage a threaded housing portion 68 so as to securely mount and seal the metal base 28 through O-rings 32 with respect to housing 12.

In accordance with one aspect of the present invention, it may be noted that while the pressure components and the electrical components have been isolated within the enclosure formed by housing 12 and modular base 26 to prevent any inadvertent spark from the electrical components to ignite potentially hazardous environments which may be present in the pressure components, yet the pressure components can be serviced and maintained without shutting down the power or requiring removal of unit 10 from the potentially hazardous area. With respect to this aspect of the present invention, note that removal of cover 38 and mask 36 from the enclosure provides access to the pressure components within pressure compartment 40 while still maintaining the isolation of the electrical components in electrical compartment 42.

Thus, the I/P nozzle block 46 can be serviced without turning off the electrical power. For instance, the pneumatic elements can be adjusted to pneumatic zero during maintenance or troubleshooting by affording access to a zero adjustment nut 70 on the I/P nozzle block unit. Also, access is permitted to a cleanout wire 72 to permit the wire to be used to cleanup the pneumatic restriction or orifice in the air supply line which can become clogged. In a similar manner, the pressure gauges can be threadably removed from the module and replaced, if necessary, without shutting off the power supply. Servicing of the pneumatic relay can also be performed with the complete isolation of the electrical components in electrical compartment 42.

In accordance with another aspect of the present invention, it may be noted that pressure gauges 50 and 52 are mounted totally within the enclosure formed by housing 12 and modular base 26 so they are not subject to the environment or to any physical damage from actions outside of the housing. Yet, the pressure gauges can be removed or are subject to repair by removing replaceable cover 38 and mask 36 to provide access to pressure compartment 40.

Figure 4:
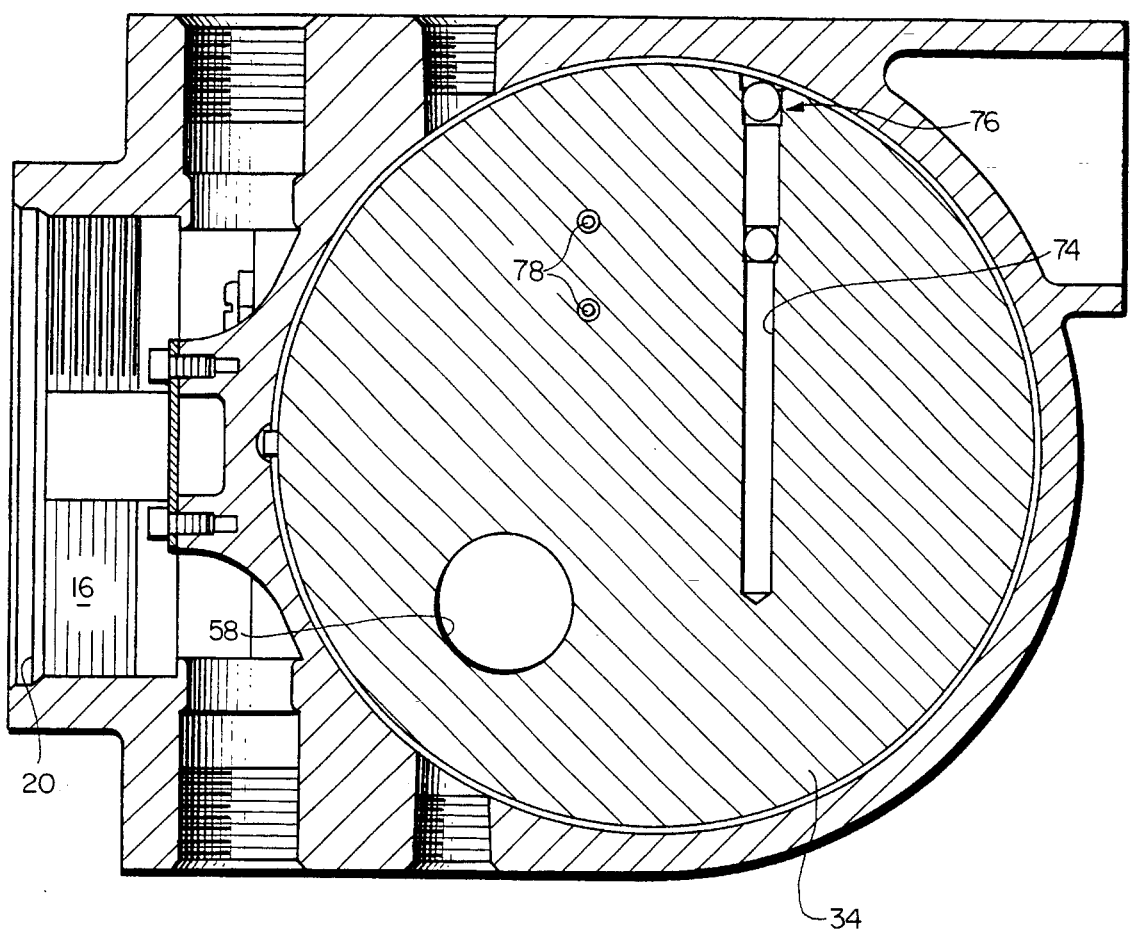
FIG. 4 is a sectional view taken along section lines 4—4 of the current to pressure transducer shown in FIG. 2, with certain components removed for clarity.
Figure 4A:
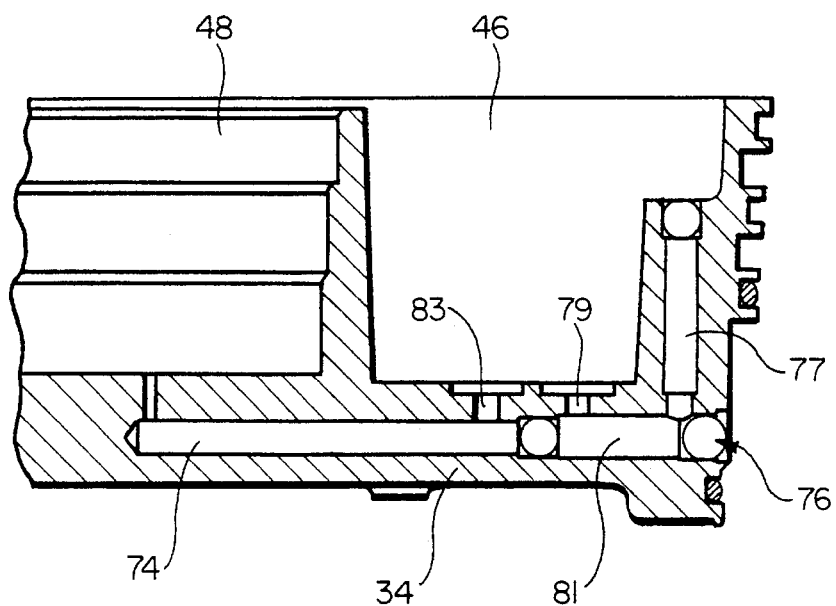
FIG. 4A is a fragmentary sectional view taken along section lines 4A—4A of the current to pressure transducer shown in FIG. 1.

FIG. 4 illustrates the modular wall 34 which contains a longitudinal passageway to communicate the inlet pneumatic supply at an inlet end 76 into I/P nozzle block 46 and to communicate the I/P nozzle block variable pressure output into the pneumatic relay 48. Referring now to FIG. 4A, there is illustrated modular wall 34 and the passageways through the modular base for connecting the supply pressure from inlet end 76 to passageways 77 and 79 to the I/P nozzle block 46 from the main supply passage 81. The variable pressure output of nozzle block 46 is supplied through a passageway 83 to interconnecting passageway 74 to the pneumatic relay 48.

With reference to FIG. 3, it can be seen that passageway 81 connects to a transverse passageway 85 at the inlet end 76 for eventual communication with inlet port 22 for receiving the pneumatic supply pressure when the modular unit is mounted in the housing.

With reference to FIG. 4, apertures 78 are shown in the modular wall to permit the electrical connections from printed circuit board 54 through the modular wall to the I/P nozzle block. As indicated previously, these apertures also contain suitable explosion proof seals to isolate and prevent any sparks in electrical compartment 42 from causing ignition of potentially hazardous environment through the wall 34 and into pressure compartment 40.

Figure 5:
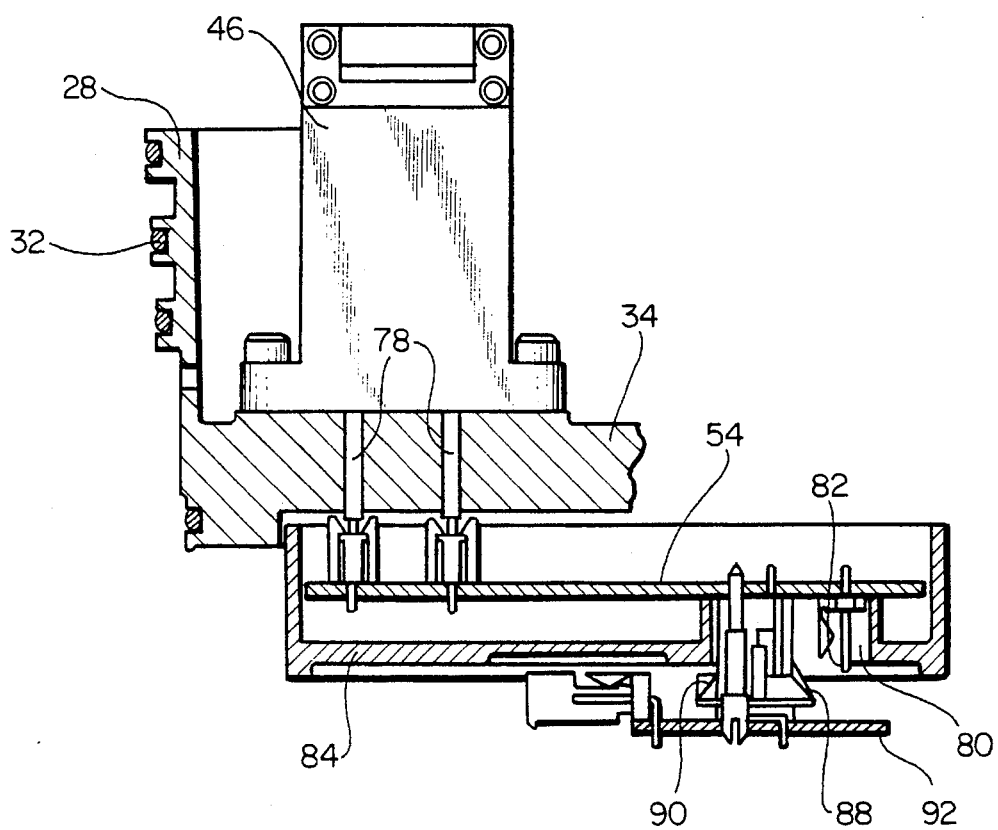
FIG. 5 is a fragmented sectional view taken along section lines 5—5 of the current to pressure transducer shown in FIG. 1, with certain components removed for clarity.

In accordance with another aspect of the present invention, the mating of connections between the housing terminals and the modular terminals is provided by a blind connection, i.e. automatically as modular base 26 is insertably mounted into housing 12. The electronic components on printed circuit board 54 are electrically connected to a modular terminal strip 80 containing modular terminals 82, which as shown in FIG. 5 consist of a plurality of male terminal pins. Printed circuit board 54 is mounted within a plastic cover 84, preferably by epoxy molding of all of the units within the plastic cover. Cover 84 is in turn mounted to modular wall 34 through the use of appropriate threaded screws 86. As shown in FIG. 5, modular terminals 82 protrude through cover 84 for engagement with female housing terminals 88 contained on a housing terminal strip 90 which in turn is mounted to a housing interconnect board 92.

Figure 6:
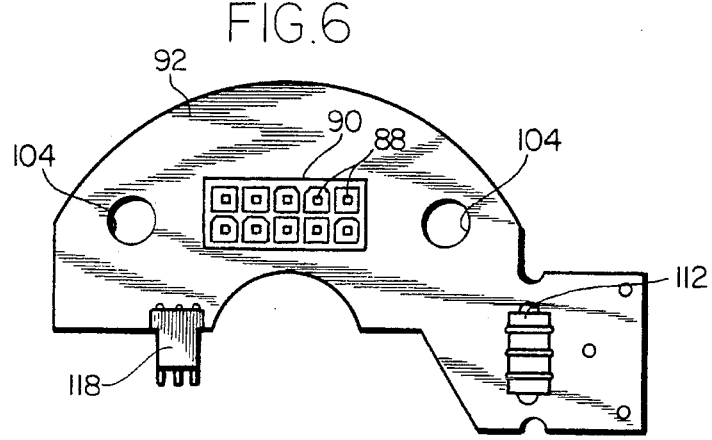
FIG. 6 is an elevational view showing an interconnect board for connecting electrical terminals.
Figure 7:
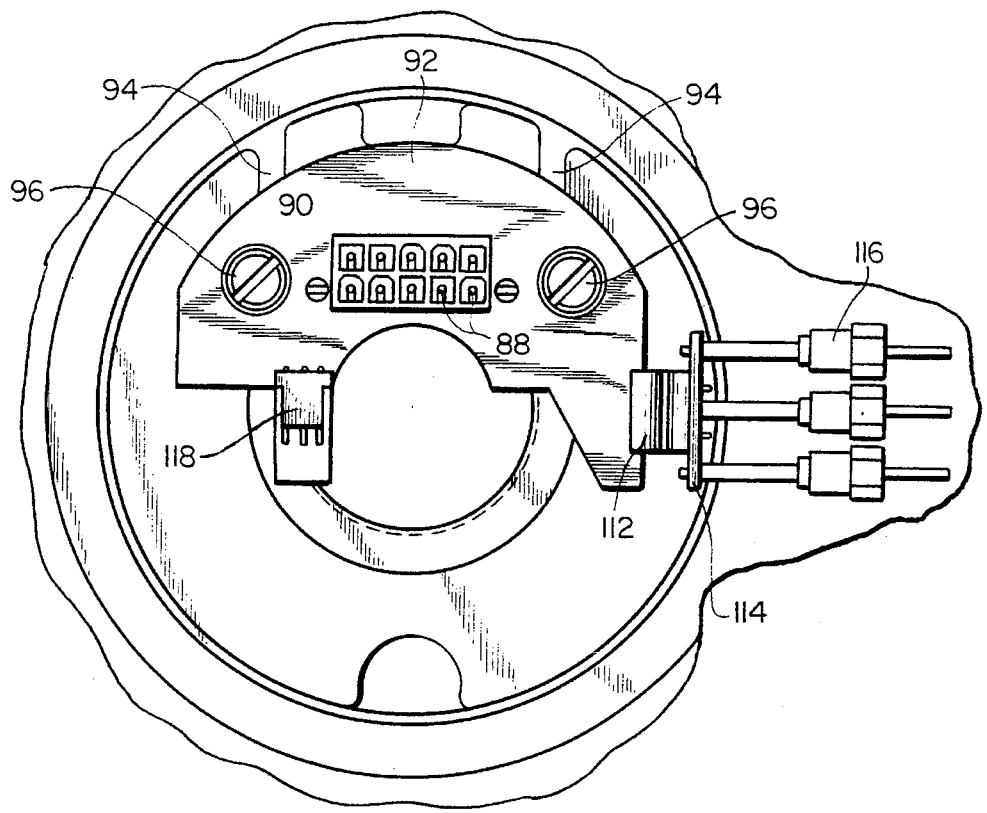
FIG. 7 is an elevational view showing the interior of the housing with the interconnect board floatably mounted therein.

With reference to FIGS. 6 and 7, there is indicated the manner in which the housing interconnect board is floatably mounted so as to permit self-aligning of the board with the modular terminal pins. Housing side 44 includes a pair of upright ribs 94 each having a threaded aperture for receiving a respective mounting screw 96. Preferably, mounting screws 96 are shoulder screws so that the bottom of the shoulder butts against the rib and prevents further penetration of the shoulder screw into the threaded aperture of the rib.

Figure 8:
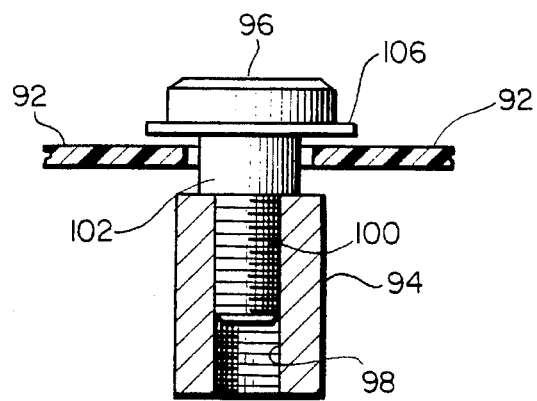
FIG. 8 is a schematic sectional view showing a shoulder screw mounting the interconnect board in a floating manner.

Referring to the schematic illustration of FIG. 8, this configuration is illustrated in more detail. Threaded aperture 98 within rib 94 receives a threaded portion 100 of screw 96 until a shoulder 102 compressingly abuts against rib 94. As seen in FIG. 8, the length of shoulder 102 is greater in dimension than the width of housing interconnect board 92. Therefore, the housing interconnect board can float longitudinally along screw 96 and between the screw head and the top of rib 94. If desired, screw head 96 can be sized for this purpose or, a larger washer 106 may be utilized. In addition, apertures 104 in housing interconnect board 92 are made slightly larger in diameter than the diameter of shoulder 102. This permits the interconnect board to slightly move transversally with respect to the screw. Thus, housing interconnect board is securely captured by screw 96 and ribs 94 but is allowed to float in position between the screw and the rib so that the housing terminals are self-aligned with the modular terminals during the insertable mounting of modular base 26 into the housing.

To guide the modular terminals in the correct orientation with respect to the housing terminals, a longitudinal groove 108 is provided on the inside surface of the housing. Groove 108 matches an indexing pin 110 which is fixed within the outer surface of metal base 28. Thus, in inserting modular base 26 into the housing, the modular base is rotated until indexing pin 110 is fitted within longitudinal groove 108 to correctly position modular terminals 82 with the housing terminals 88. Thereafter, as threaded ring 30 is rotated to move the modular base into the housing, because of the floating mounting of housing interconnect board 92, the female housing terminals 88 become self-aligned with the male modular terminals 82 to achieve the final electrical interconnection of the modular base with the housing interconnect board as shown in FIG. 5.

A flexible electrical cable 112 interconnects the housing interconnect board 92 with a small printed circuit board 114 which in turn is connected to a series of RFI filters 116 with the filters 116 connected through housing 12 to appropriate field terminals 18.

Since the transducer unit can readily be converted to a positioner as known in the art, housing interconnect board 92 also includes suitable connections 118 for connection to a potentiometer. For a transducer unit, a plug 120 is threadably mounted into housing side 44 to close off electrical compartment 42. When the unit is to be used as a positioner, a potentiometer can be mounted in the electrical compartment for electrical connection to connectors 118 and with the potentiometer shaft extending through an aperture with suitable flame arresting devices in a plug.

Figure 9:
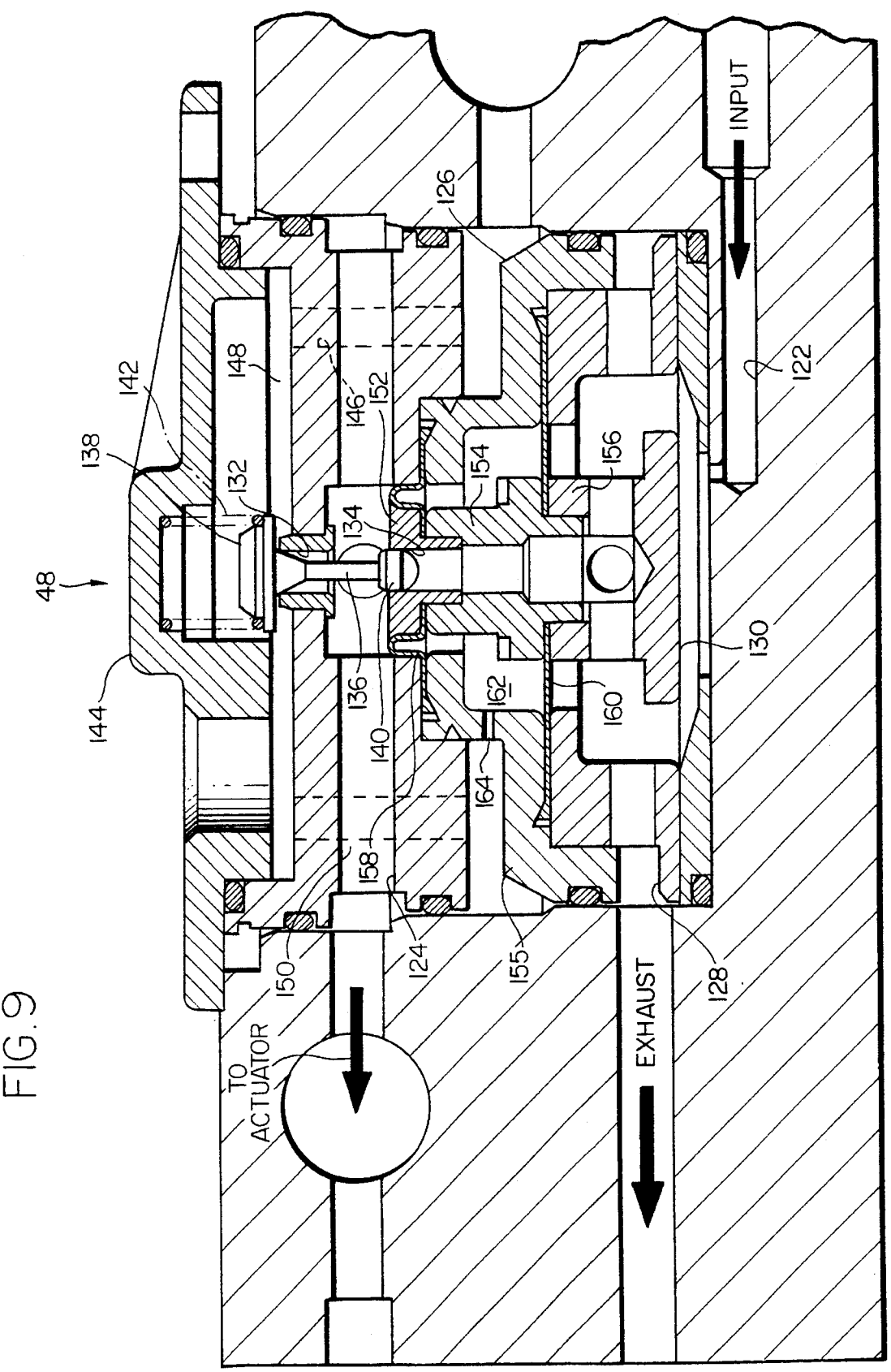
FIG. 9 is a sectional view showing a supply biased pneumatic pressure relay.

Referring now to FIG. 9, there is illustrated an improved pneumatic pressure relay 48 which receives a variable control pressure on inlet 122 and delivers a variable output pressure on outlet 124 coupled to pneumatic outlet 24 of housing 12 (see FIG. 1) for communication with a valve actuator. Relay 48 also includes a supply pressure inlet 126 coupled to the inlet 22 of housing 12 (see FIG. 1) for connection to a source of pneumatic supply pressure. Relay 48 also includes an exhaust outlet 128.

Pneumatic pressure relay 48 includes a supply bias portion for establishing the start point of the pneumatic pressure input range at inlet 122 for a given supply pressure at inlet 126. The start point input pressure will change with changing supply pressures and therefore allows the relay 48 to operate at different supply pressures without hardware changes, such as bias springs. With reference to FIG. 9, it may be seen that relay 48 includes an input signal diaphragm 130, an input supply port 132, and an exhaust port 134. The movement of diaphragm 130 in response to the variable pressure input on inlet 122 controls the opening and closing of the input supply and exhaust ports. A valve rod 136 includes a supply valve plug 138 at one end and an exhaust valve plug 140 at the other end.

A valve spring 142 seated against plug 138 and cap 144 normally maintains plug 138 seated against input supply port 132 as shown in FIG. 9. This blocks the supply pressure from inlet 126 from reaching the actuator outlet 124 which supply pressure otherwise would communicate through passageways 146, 148, through an open input supply port 132 and through a passageway 150 to actuator outlet 124.

The drive coupling between input signal diaphragm 130 and valve rod 136 is provided through three intermediate diaphragm mounting bodies, namely an upper body 152, a middle body 154 and a lower body 156. An upper supply bias diaphragm 158 is captured between bodies 152, 154 and a lower supply bias diaphragm 160 is captured between middle block 154 and lower block 156.

A supply bias cavity 162 is defined between diaphragms 158, 160, middle block 154 and an outer casing 155. A small capillary hole 164 through casing 155 communicates the supply bias cavity with supply pressure inlet 126 so that the supply bias cavity is substantially always under the supply pressure. Thus, the supply pressure is not only channeled to input supply port 132, but also enters supply bias cavity 162 via capillary hole 164. It is desirable that once the supply pressure is established in cavity 162, that it not change during the operation of relay 48. Momentary fluctuations in the supply pressure can result when supply port 132 is opened and closed. The capillary hole isolates the supply bias cavity from pressure transients created when valve plug 138 opens or closes supply port 132 in response to load changes. This effectively stabilizes the valve assembly when brief pressure fluctuations occur due to input signal changes thereby resulting in improved performance.

FIG. 9 illustrates relay 48 in its normal position. When an increasing variable pressure is coupled to inlet 122, input signal diaphragm 130 is flexed upwardly in FIG. 9 to move bodies 156, 154, 152, exhaust plug 140, rod 136 and valve plug 138 also upwardly to unseat the supply port 132.

Exhaust port 134 remains closed. Supply pressure is thereby coupled from inlet 126 through passageways 146, 148 and through open supply input port 132 and passageway 150 to actuator outlet 124 and eventually to the valve actuator. It may be noted that lower supply bias diaphragm 160 contains a greater diaphragm area than the upper supply bias diaphragm 158. This enables biasing the relay to form an output start point commensurate with the input signal based on the given supply pressure.

II. Convertible Current To Pressure Positioner

Reference may now be made to FIGS. 10–18 wherein there is illustrated a preferred embodiment of an electro-pneumatic instrument which is readily convertible from a current to pressure positioner to a current to pressure transducer and vice versa. The assembled views of FIGS. 10 and 11, for instance, illustrate a preferred electro-pneumatic convertible instrument 200 providing optimum flexibility in configuration over such presently available devices. In particular, the configuration is modular with respect to several main instrument components, thereby providing the following advantages:

(1) Enabling a ready conversion of the instrument from a valve positioner to a pressure transducer in a manner not available with prior instruments; and (2) Enabling different types of terminal boxes to be replaceably mounted on the housing for accommodating a variety of field connections and configurations.

Figure 10:
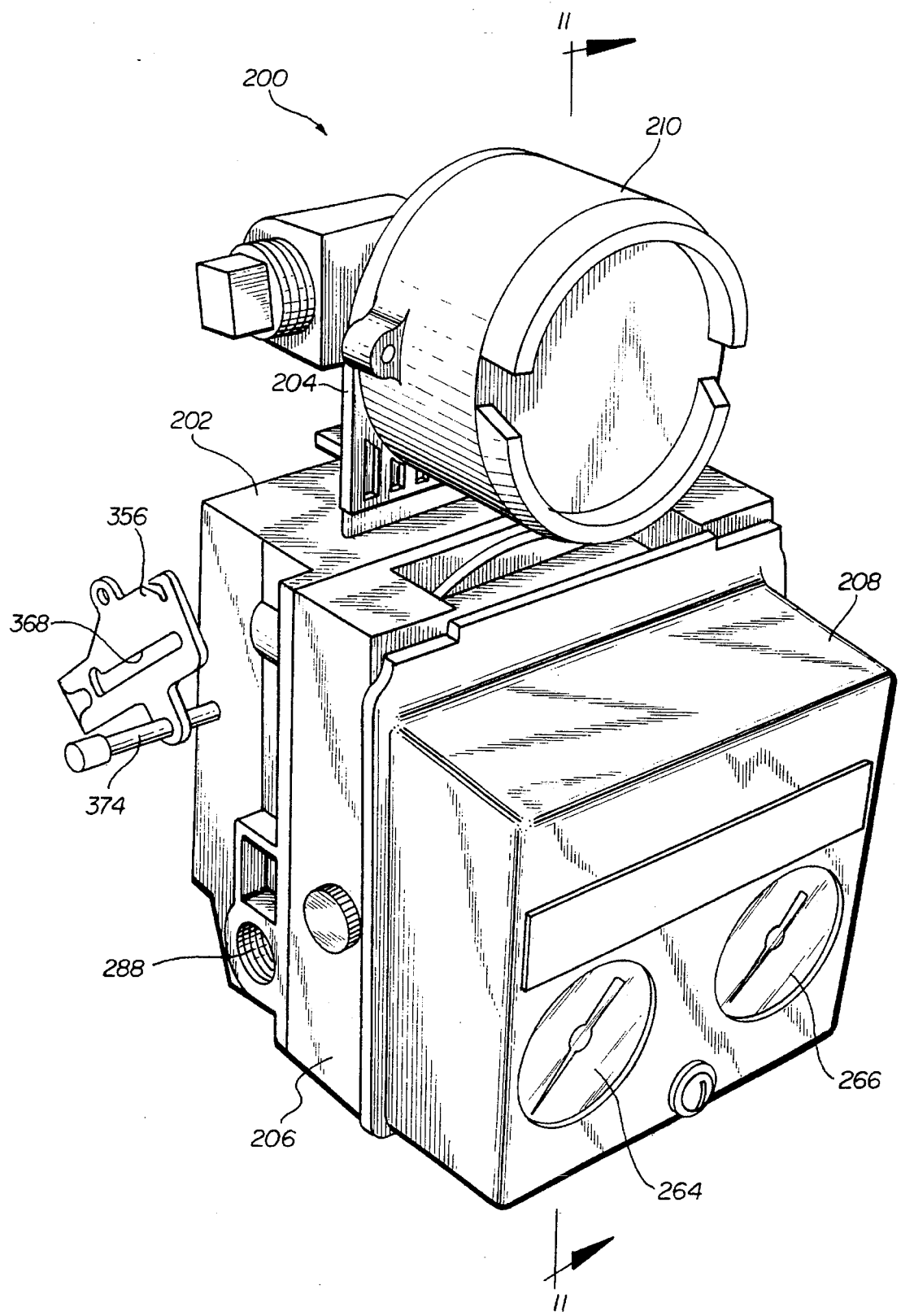
FIG. 10 is a perspective view of a preferred embodiment of the invention illustrating a valve positioner in modular configuration which can be readily converted to a pressure transducer.
Figure 11:
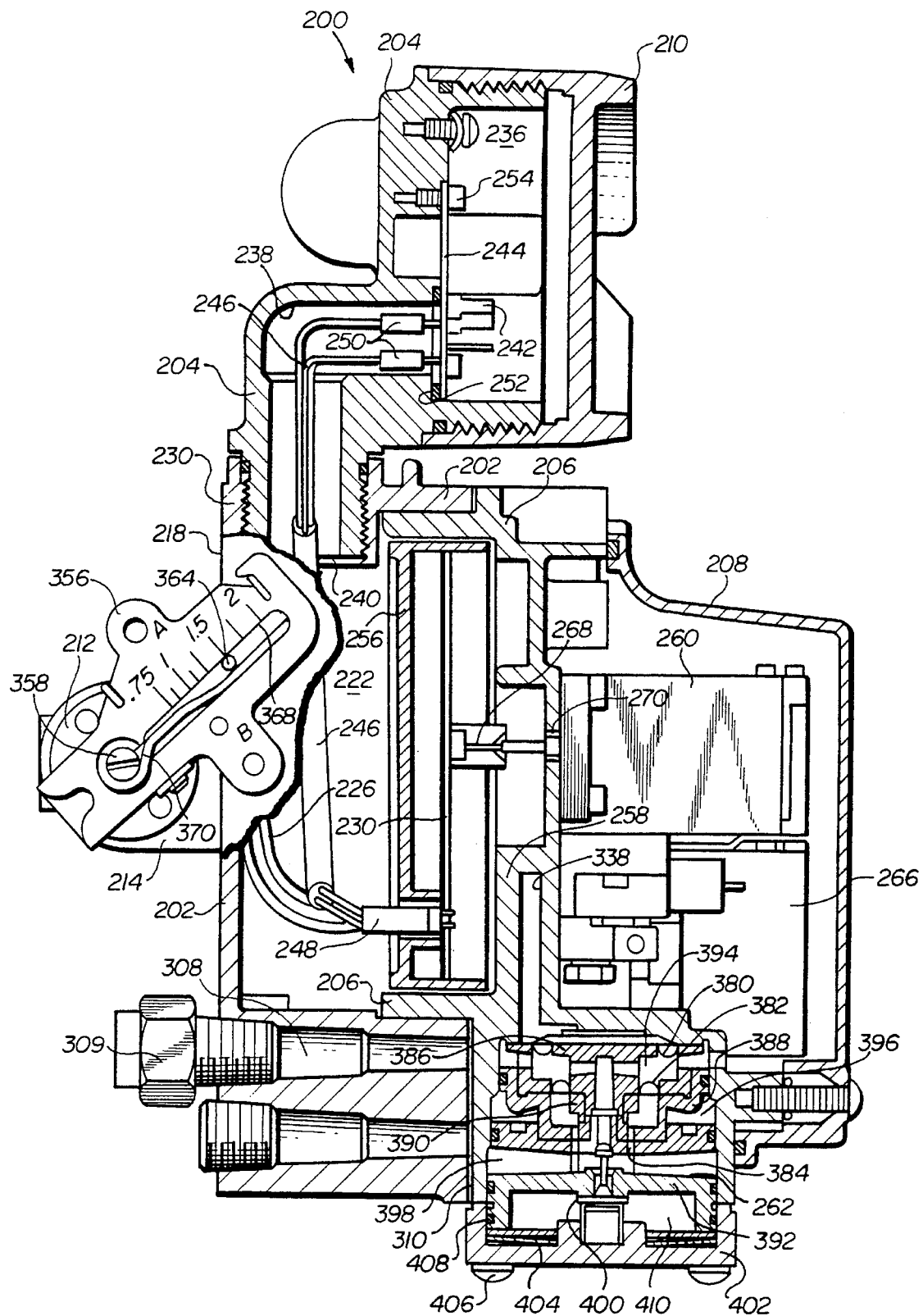
FIG. 11 is a sectional view of the preferred embodiment of the invention taken along section lines 11—11 of the valve positioner shown in FIG. 10.

The electro-pneumatic convertible instrument 200 shown in the assembled views of FIGS. 10 and 11 is in the form of a valve positioner which includes several basic enclosure components in modular form, i.e., a housing 202, a field terminal box 204 separable from and replaceably mounted on housing 202, and a modular base 206 also replaceably mounted onto housing 202. A removable cover 208 for the instrument enclosure is removably mounted on modular base 206. A terminal box cover 210 is mounted on field terminal box 204 to protect the contents from the environment.

Instrument 200 is in the form of a valve positioner which includes a bushing 212 mounted into an elongated cylindrical boss 214 which extends along the housing for mounting a potentiometer assembly 216. Elongated cylindrical boss 214 is formed integrally with housing 202 as a cast unit so as to extend along housing back wall 218 (see FIG. 11). Boss 214 is hollow and includes an interior pocket 220 which intersects and communicates with the hollow interior 222 of housing 202. As can be seen in the exploded view of FIG. 12, potentiometer assembly 216 is inserted with potentiometer 224 being placed into the interior pocket 220 and with the potentiometer leads 226 and connector plug 228 extending through interior pocket 220 and into the housing hollow interior 222 to connect to a printed circuit board 230 mounted within the modular base 206. Bushing 212 is then slipped over potentiometer shaft 232 and threadably engaged into the boss 220 so as to supportably mount the potentiometer shaft 232 and maintain potentiometer assembly 216 mounted within housing 202.

Figure 12:
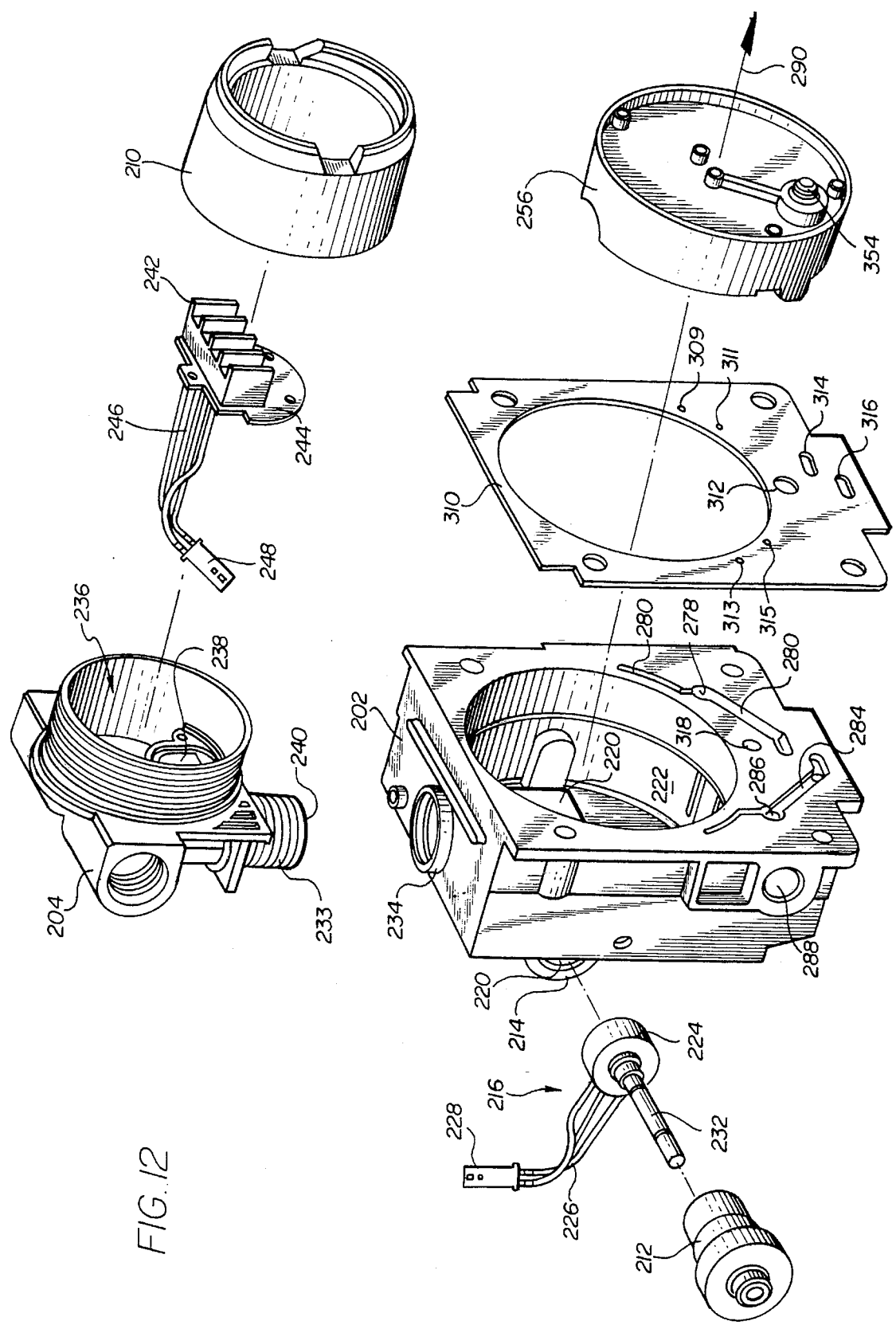
FIGS. 12 and 12A are exploded perspective views of the modular configured valve positioner of FIG. 10, the two figures being consecutively locatable along the same central reference axis along the direction indicated by the respective arrowheads.

Referring to the assembled view of FIG. 11 and the exploded view of FIG. 12, there is illustrated the manner in which the various components including the potentiometer assembly 216 are mounted to housing 202. In particular, field terminal box 204 includes a male threaded end portion 233 which is threadably engaged with a corresponding female threaded portion 234 on housing 202. Terminal box 204 includes an interior portion 236 which leads to a tubular passageway 238 which extends from interior 236 and at right angles through terminal 204 to the other terminal end 240 which communicates with the hollow interior 222 of housing 202.

A field terminal block 242 is mounted to a printed wiring board 244 and which in turn is mounted to a cable harness 246 ending in a connector plug 248. As is seen from FIG. 12, the terminal block, printed wiring board, cable harness and connector plug have all been combined into one assembly. In particular, it may be noted that the cable harness includes radio frequency interference (RFI) filter feedthroughs 250 (see FIG. 11).

A significant advantage of this configuration is that it reduces manufacturing costs required for installing threaded RFI filters into the housing and then soldering the printed wiring board and terminal block assembly to the RFI filters. Furthermore, the terminal assembly shown in FIG. 12 can be more easily replaced and is more reliable in installation and operation. In installing the field terminal block 242, and associated cable harness, connector plug 248 is inserted into the interior 236 and then into tubular passageway 238, continuing beyond terminal end 240 and into the hollow interior 222 of housing 202. Plug 248 may then be connected to main printed circuit board 230 on the modular base 206. Within terminal box 204, printed wiring board 244 is moved against one end of tubular passageway 238 until the board butts against an O-ring 252 and the printed wiring board 244 is maintained in position by means of screws 254. O-ring 252 acts as a seal to maintain the housing interior 222 and the main circuit board 230 sealed off from the environment. Terminal box cover 210 is then threadably mounted on the terminal box so as to aid in maintaining the electrical components free from the environment.

Modular base 206 contains a main electrical compartment 256 segregated on one side of a dividing wall 258 with pneumatic components on the other side of wall 258. In particular, a current to pressure converter device such as an I/P nozzle block—flapper unit 260, a pressure relay 262, and pressure gauges 264, 266 are all mounted to modular base 206 on one side of dividing wall 258 so as to be physically isolated and segregated from the electrical components on the other side of wall 258. The electrical components are thus maintained within an explosion proof portion of the instrument enclosure. Also, all of the electrical and pneumatic components, including the pressure gauges are maintained within the instrument enclosure. Cover 208 contains respective transparent viewing windows to permit visual reading of gauges 264, 266.

Electrical connections from main printed circuit board 230 to the I/P converter are supplied through electrical contacts 268 coupled through suitable apertures 270 to the I/P converter 260. Aperture 272 in wall 258 is for coupling the supply pressure to the I/P converter 260. Aperture 274 is for coupling the variable pressure from the I/P converter to the instrument output as will be described in more detail hereinafter.

FIG. 16 is a front view of the housing face showing the supply pressure coupled to input port 276 with a passageway 278 connecting the supply pressure to open channels 280 in housing surface 282. Surface 282 also includes another set of open channels 284 which connect to a passageway 286 communicating with the instrument output port 288. Accordingly, open channels 280 and housing surface 282 are associated with the pressure on the input side or supply pressure side of the system and open channels 284 in surface 282 are associated with the variable output pressure side of the instrument.

Figure 12A:
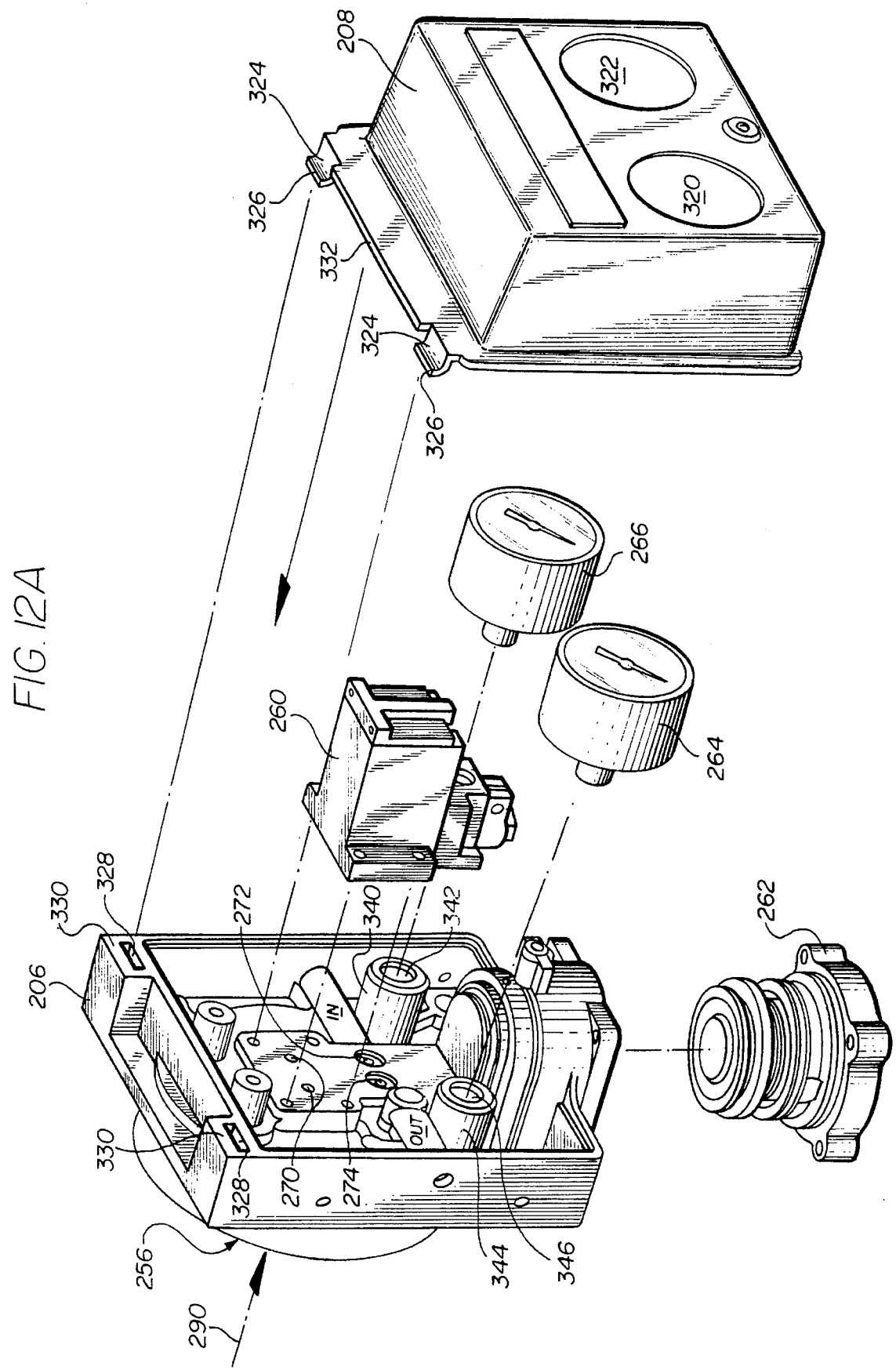
Figure 13:
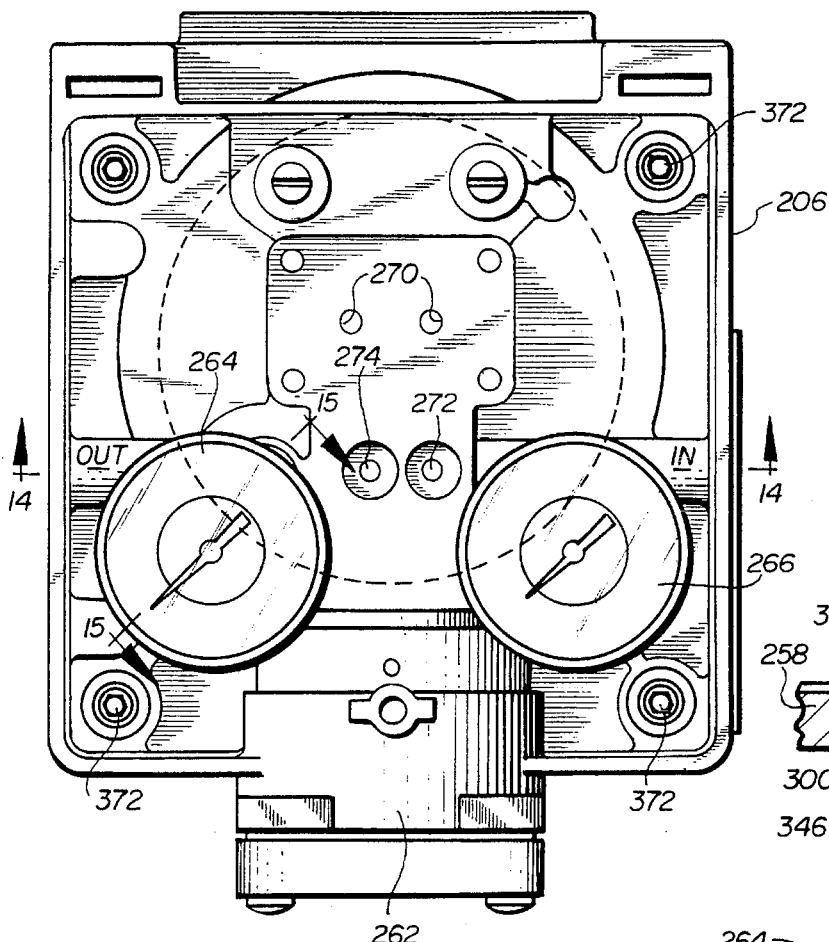
FIG. 13 is an elevational view showing a modular base with some components removed for clarity.

FIG. 17 illustrates a rear view of modular base 206, i.e. viewing the modular base from the direction of reference arrow 290 in FIG. 12A with the electrical compartment 256 removed for ease of illustrating the rear surface 292 of modular base 206. FIG. 17 shows several passageways which are provided in modular base 206 to communicate with the fluid passageways and channels in housing 202 for fluidly interconnecting the various components on the instrument. As an example, in FIG. 17, passageway 294 is the relay exhaust passageway, passageway 296 communicates supply pressure to the relay, and passageway 298 communicates the variable pressure output of the relay and therefore comprises the instrument output. Passageway 300 communicates with the output pressure gauge 264 and passageway 302 communicates with the input pressure gauge 266. Passageway 304 is coupled to the output pressure sensor 354, and passageway 306 is connected to the I/P converter supply pressure input (see FIG. 14).

As can be seen from the illustrated position of the components in the exploded views of FIGS. 12 and 12A, and with specific reference to FIGS. 16 and 17, the input supply pressure on input port 276 which is coupled to passageway 278 and channel 280 communicates with passageway 296 to supply pressure to relay 262. Relay exhaust passageway 294, communicating through passageway 318 (see FIG. 16), exhausts out the relay exhaust port 308 as shown in FIG. 11. A plastic vent assembly 309 prevents dirt and debris from access to relay exhaust port 308.

Intermediate surface 282 of the housing 202 and surface 292 of modular base 206 there is provided a gasket 310 which can be formed of flexible rubber material. Gasket 310 covers the open channels 280 and 284 so as to form fluid passageways in the housing 202. Furthermore, gasket 310 includes a series of apertures for desirably coupling fluid channels between the modular base and the housing. Note for instance apertures 312, 314, 316 which are respectively aligned with passageways 294, 296, 298 on modular base 206 as well as with respective passageway 318, channel 280, and 284.

Removable cover 208 includes transparent sections 320, 322 for viewing the pressure gauges 264, 266 when the cover is closed in position. As can be seen from FIG. 12A, cover 208 includes a pair of curved ears 324. Cover 208 is mounted onto modular base 206 by first elevating cover 208 until leading edge 326 of each ear 324 is directly facing a respective cover mounting slot 328 in modular base upper wall 330. This places the curved ear portions 324 substantially in line with the longitudinal slot so that they can be inserted into the slot until the cover front edge 332 abuts the modular base upper wall 330. At this point the cover 208 may now be rotated downwardly to the closed position with the curved ears 324 aiding in maintaining the cover in the downward closed position.

Figure 14:
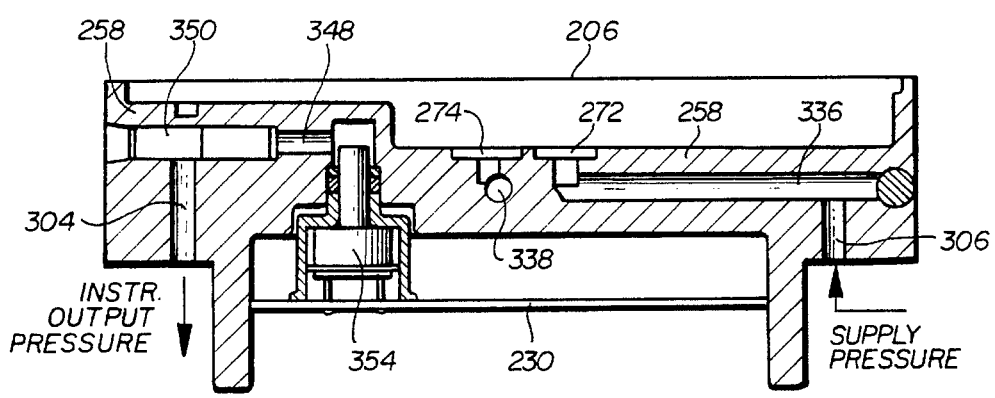
FIG. 14 is a sectional view taken along section lines 14—14 of the modular base shown in FIG. 13.

Referring now to FIGS. 13–16, there is illustrated the details of mounting of the pressure components on modular base 206 and their fluid interconnections through appropriate passageways. For convenience, in FIG. 13, the input pressure side has been labeled "IN" and the output pressure side has been labeled "OUT". Referring to FIG. 14, supply pressure through passageway 306 is supplied from input port 276 (see FIGS. 16 and 17), channels 280, hole 309 in gasket 310 (see FIG. 12), through passageway 306. Passageway 306 interconnects with intersecting passageway 336 which in turn communicates with passageway 272 which provides the input supply pressure to I/P converter 260.

The pressure output side of I/P converter 260 is coupled to passageway 274 and then to a vertical passageway 338 in dividing wall 258, the passageway 338 coupling in turn with the variable pressure input to the input diaphragm of pressure relay 262 as shown in FIG. 11. Input pressure gauge 266 is mounted to an upstanding ledge 340 containing a passageway 342 which communicates with passageway 302 (see FIG. 17) so as to couple input supply pressure from channel 280 and input port 276 to pressure gauge 266.

Figure 15:
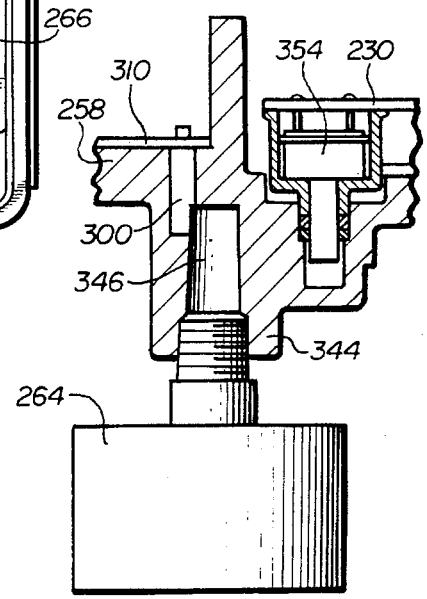
FIG. 15 is a fragmented view partly in section showing a pressure sensor sensing the output pressure.

With reference to FIG. 15, it can be seen that in a similar manner the output pressure gauge 264 is mounted on an upstanding ledge 344. Ledge 344 in turn includes passageway 346 which communicates with passageway 300 which in turn passes through hole 315 in gasket 310 so as to communicate with channel 284 in housing 202. This enables gauge 264 to sense and indicate the output pressure of the instrument.

The instrument variable output pressure developed by pressure relay 262 is coupled from the output chamber of pressure relay 262 to passageway 348 and through a flame arrester 350 to an intersecting passageway 304, which in turn communicates the pressure through hole 313 on gasket 310 to channel 284 on housing 202. A pressure sensor 354 may be provided for sensing the output pressure through passageway 348 as shown on FIG. 14. When this instrument is used as a valve positioner, pressure sensor 354 can be used for diagnostic purposes. When the instrument is used as a current to pressure transducer, the pressure sensor 354 acts as the feedback mechanism for the system as will be described more particularly hereinafter.

Figure 18:
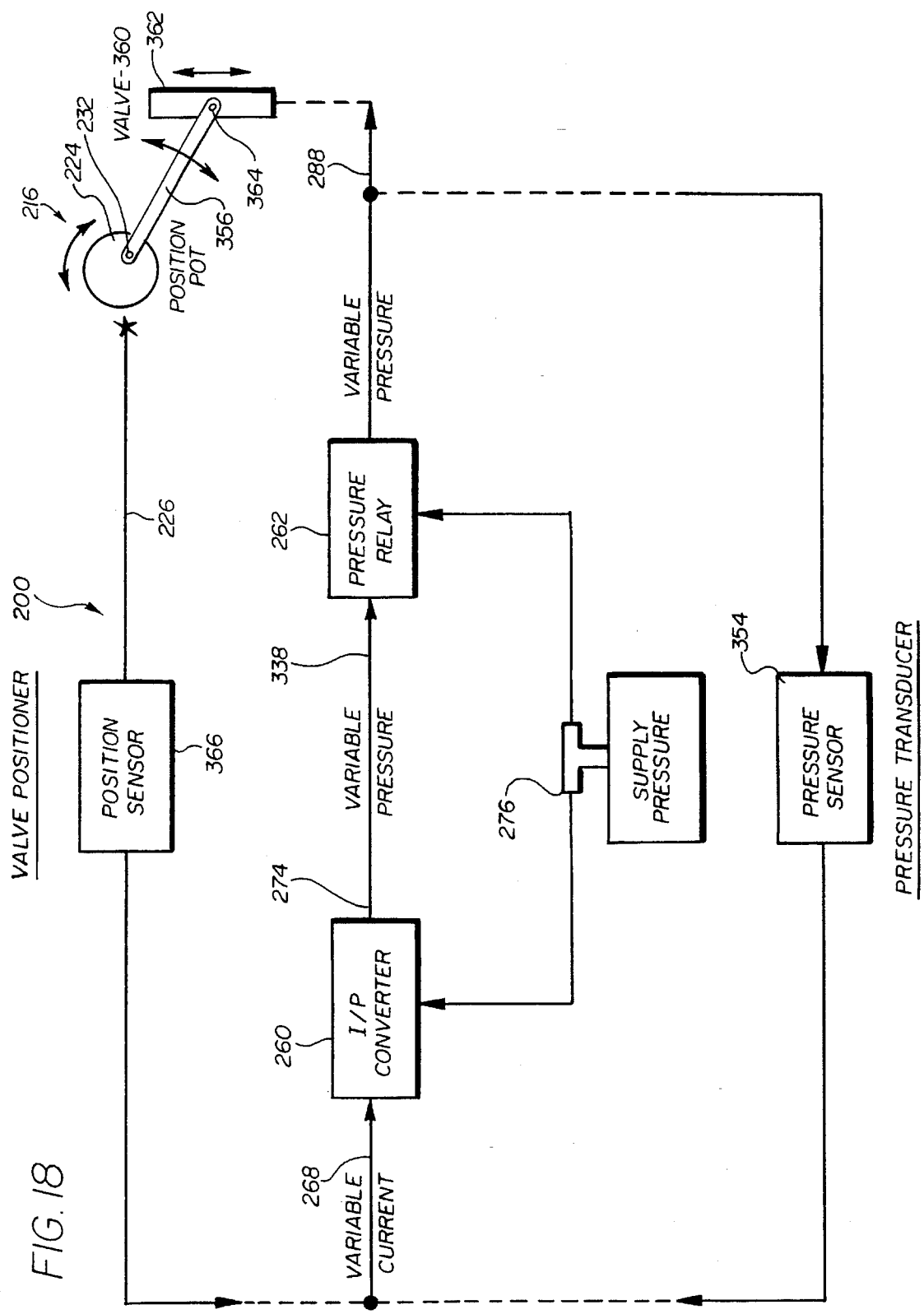
FIG. 18 is a schematic block diagram illustrating the electro-pneumatic converter instrument readily convertible from a valve positioner to a pressure transducer and vice versa.

Reference may now be made to FIG. 18 wherein there is illustrated a schematic block diagram of instrument 200 with the major components shown in a functional block diagram as used for either a valve positioner or as a pressure transducer. As illustrated with respect to the preferred embodiment of the invention shown in FIGS. 10–17, there is shown a current to pressure positioner in the form of a valve positioner which includes an I/P converter 260 and pressure relay 262 mounted on modular base 206. Also, housing 202 contains a housing portion, i.e. integral hollow boss 214 and an interior pocket 220 for receiving a potentiometer assembly 216 including a position potentiometer 224. When used as a valve positioner, instrument 200 includes a feedback arm 356 which includes screw attachment means 358 for attaching the feedback arm 356 (see FIGS. 10 and 11) to potentiometer shaft 232 so that the shaft 232 is rotated by the feedback arm 356.

With reference to FIG. 18, there is schematically illustrated a fluid control valve 360 and a sliding valve stem actuator 362 with the valve actuator containing a pin 364 connected to move with the valve stem during linear valve stem movements. Accordingly, as valve stem 362 is moved vertically up or down as shown by the reference arrows in FIG. 18, pin 364 also moves with the valve stem, and with the pin being coupled to feedback arm 356, the feedback arm is rotated in the manner illustrated by the rotational reference arrows. Rotation of feedback arm 356 rotates the potentiometer shaft 232 and changes the position of the potentiometer 224 so that the changed position is sensed by position sensor 366 to couple a variable current to the input of the I/P converter 260. Rather than the potentiometer, other feedback elements with capacitors, inductors, or active elements can be used.

FIG. 11 illustrates the pin 364 maintained in a biased position in a slot 368 in feedback arm 356. A spring clip 370 is biased to maintain pin 364 against the side of slot 368.

Accordingly, as the pin 364 is moved in movements following the valve stem 362, pin 364 also moves linearly within slot 368 so as to rotate feedback arm 356 and register the valve position change into a change in the position of potentiometer 224. The signal indicating the change in potentiometer position is carried by potentiometer leads 226 to the position sensor 366 which is mounted on the main circuit board 230 within electrical compartment 256. The corresponding variable current signal input to the I/P converter 260 is carried on input leads 268 from the circuit board 230 through apertures 270 and into the I/P converter 260.

Accordingly, in the illustrated preferred embodiment of the invention where the instrument is acting as a valve positioner 200, a variable pressure output on output port 288 moves valve stem 362 and pin 364 in a certain manner. This movement is translated by feedback arm 356 into a changed position in potentiometer 224. The changed position is sensed by position sensor 366 and transformed into a variable current supplied on leads 268 into the I/P converter 260 to provide a variable pressure on line 274.

In accordance with one significant advantage of the present invention, the instrument can readily be converted to a pressure transducer. In order to accomplish this conversion, electrical compartment 256 may need to be replaced in order to provide a new main circuit board 230. That is, it is preferred that the circuit board 230 and the electrical components within electrical compartment 256 are potted within the hollow structure. However, the electrical compartment can readily be changed by removing four screws 372 to separate modular base 206 from housing 202, and then removing plugs 248 and 228 from the main circuit board 230 before removing electrical compartment 256 and replacing it with one suitable for use as a pressure transducer. Also, the potentiometer assembly 16 and bushing 212 could be removed from housing boss 214 and replaced by a suitable plug, or these components can simply be left in position but not connected with the main circuit board. In any event, in the current to pressure transducer mode, the feedback of variable pressure on output port 288 is coupled through pressure sensor 354 to provide a variable current signal supplied on input lead 268 to the I/P converter 260.

It is understood of course that if the original instrument had been set up as a current to pressure transducer, to convert the instrument to a current to pressure positioner would simply have required placement of a potentiometer assembly 216 with a bushing 212 into the interior pocket 220 of housing boss 214; changing the main circuit board 230 and preferably the entire electrical compartment 256 with a new one adapted for valve positioner operations; and mounting of feedback arm 356 to the potentiometer shaft 232 and placing pin 364 in slot 368 for a sliding stem valve operation. It is also understood of course that if a rotary shaft actuator is used for a fluid valve instead of a sliding stem situation, then a suitable feedback arm like feedback arm 356 would be coupled to potentiometer shaft 232 and also coupled to a suitable rotary movement feedback link from the rotary actuator so that movements of the feedback link generate rotations of potentiometer shaft 232. Other types of feedback elements, instead of a potentiometer, can be utilized and incorporated into instrument 200 in accordance with the teachings herein. For example, feedback elements using capacitors, inductors, or active elements could be used in place of a potentiometer, or in combination.

It is preferred that feedback arm 356 is stabilized with respect to housing 202 during transit and initial system calibrations, by means of a pin 374 passing through a suitable aperture in feedback arm 356 as shown for instance in FIG. 10. During operation of the instrument 200 the pin 374 is removed.

Referring now to FIGS. 11 and 12A, there is illustrated an improved pressure relay which utilizes plastic molded structural body components which can be ultrasonically welded together in a manner to clamp the diaphragms to provide the pressure seals so as to eliminate the need for machine screws. In accordance with this aspect of the invention, assembly costs for the pressure relay are drastically reduced and loose parts are minimized. In particular, the plastic body components are formed of a glass filled polyphenylene oxide; the diaphragms are formed of a nitrile with a polyester fabric; and the O-rings are formed of Buna-N rubber material. In particular, input diaphragm 380, supply bias diaphragm 382, and feedback diaphragm 384 are maintained spacially separated by the relay body parts and to form the required chambers in the relay. Exhaust body 386, diaphragm retainer 388, diaphragm spacer 390, and supply body 392 are plastic components which maintain the diaphragms separated and form respective relay chambers. The respective relay chambers as formed in relay 262 are shown in FIG. 11 as an input pressure chamber communicating with passageway 338, exhaust chamber 394, supply pressure chamber 396, and output pressure chamber 398.

All of the aforementioned relay components may be ultrasonically welded together using conventional ultrasonic welding equipment and technique. Thus, the main relay body components are readily assembled with ultrasonic welding and without the need for any metal screws or other metal attachments.

The remaining metal components may then be inserted into the relay, such as valve plug 400, and the conventional supply port and exhaust port. A metal cap 402 and Belleville springs 404 along with suitable screws 406 are used to secure relay 262 to modular base 206. A series of O-rings 408 are used on the perimeter of relay 262 in order to seal the various relay chambers from each other when installed within modular base 206. Also, within relay 262, supply pressure from chamber 396 is supplied to formed chamber 410 so that the chamber 410 between cap 402 and supply body 392 is maintained at the supply pressure. Accordingly, this improved pneumatic relay also includes the substantially constant supply bias pressure improvement described above in connection with the embodiment of FIGS. 1–9.

The foregoing detailed description has been given for clearness of understanding only, and no unnecessary limitations should be understood therefrom, as modifications will be obvious to those skilled in the art.

We claim:

1. A supply biased pneumatic pressure relay for fluid control comprising:

a housing including a supply pressure inlet, a variable pressure control inlet, an actuator pressure outlet, and an exhaust outlet;

a supply port communicating said supply pressure inlet to said actuator pressure outlet;

an exhaust port communicating said actuator pressure outlet to said exhaust outlet;

an input diaphragm coupled to said variable pressure control inlet, and respective valve plugs engageably contacting said supply port and said exhaust port and coupled to said input diaphragm for providing a variable pressure at said actuator pressure outlet in response to variable pressure at said variable pressure control inlet by controlling the opening and closing of the supply port and exhaust port;

supply bias diaphragm means including a pair of diaphragms mounted intermediate said respective valve plugs and said input diaphragm, said pair of diaphragms defining a supply bias cavity therebetween; and flow means communicating said supply pressure inlet to said supply bias cavity for biasing said relay to form an initial pressure at said actuator pressure outlet commensurate with the variable pressure at said variable pressure control inlet based on the supply pressure at said supply pressure inlet.

2. A supply biased pneumatic pressure relay according to claim 1, wherein said flow means includes a restricted passageway between said supply bias cavity and said supply pressure inlet for isolating the bias cavity from transient fluctuations in the supply pressure.

3. A supply biased pneumatic pressure relay according to claim 2, wherein said flow means includes a capillary aperture.

4. A supply biased pneumatic pressure relay according to claim 3, wherein said pair of diaphragm means are of dissimilar diaphragm areas.

* * * * *